United States Patent [19]

Kotsakis

[11] 4,022,497

[45] May 10, 1977

[54] ONE-PIECE NUT AND SLEEVE FOR IMPROVED TUBE FITTING

[75] Inventor: Mike D. Kotsakis, Mount Prospect, Ill.

[73] Assignee: Imperial-Eastman Corporation, Chicago, Ill.

[22] Filed: Jan. 9, 1976

[21] Appl. No.: 647,704

[52] U.S. Cl. .................................. 285/4; 285/341; 285/382.7

[51] Int. Cl.² ..................................... F16L 35/00

[58] Field of Search .............. 285/382.7, 341, 342, 285/343, 340, 31, 41

[56] References Cited
UNITED STATES PATENTS

| | | | |
|---|---|---|---|
| 2,450,170 | 9/1948 | Smith | 285/340 |
| 2,544,109 | 3/1951 | Richardson | 285/382.7 X |

*Primary Examiner*—Dave W. Arola
*Attorney, Agent, or Firm*—Dominik, Knechtel, Godula & Demeur

[57] ABSTRACT

A one-piece nut and sleeve coupling element is provided with an improved frangible connector for effective and reliable shearing of the sleeve member. An interior shear groove is flanked by exterior shear grooves to define a pair of break point webs, one web becoming thinner as the other web is widened upon axial displacement of the interior shear groove from a preselected placement. A shearable break point web is therefore assured when making up a tube fitting utilizing such a one-piece nut and sleeve coupling element.

10 Claims, 4 Drawing Figures

ONE-PIECE NUT AND SLEEVE FOR IMPROVED TUBE FITTING

BACKGROUND OF THE INVENTION

This invention relates to a coupling for a tube fitting, and in particular to an improved one-piece tubular male coupling in which a sleeve is held by a frangible connection to a nut. The invention particularly relates to improvements in the frangible connection so that said sleeve is deflected into a tube and sheared off into sealing engagement when the one-piece coupling engages a female coupling.

Tube fittings conventionally include a female coupling elment which has a passageway and is internally threaded, and such female coupling element is adjusted to be oined to a male coupling element which has a passageway and is externally threaded to engage the internal threads of the female coupling element. Such tube fittings also conventionally employ a sleeve between the coupling elements which is deflected inwardly when a nose of the sleeve contacts a camming surface in the passageway of the female coupling element. Such sleeve is deflected inwardly, and bites into sealing engagement with the wall of a tube which is inserted in the aligned passageways of the couplings.

A one-piece nut and sleeve element has been introduced in the art, and such sleeve is adapted to shear off from the nut and become attached to a tube when making up the fitting. It is desirable to form such one-piece nut and sleeve because the sleeve is then positively aligned with the body member of a male coupling element which, together with the female one-piece nut and sleeve coupling, forms the fitting. Additionally, a one-piece nut and sleeve coupling element prevents the sleeve from being installed backwardly in the fitting. An example of such a one-piece nut and sleeve is shown in U.S. Pat. No. 3,743,324, owned by the same assignee as herein identified. The assignee hereof commercially supplies one-piece nut and sleeve coupling elements under the trade designation "HI-DUTY", such couplings lead to improved installation of the fitting, as well as realizing other advantages, including economies in manufacturing a one-piece nut and sleeve constuction.

Additional advantages are realized from such one-piece nut and sleeve coupling elements, for example, the nut portion guides the sleeve and prevents cocking until the deflectable nose portion of the sleeve has been substantially deflected into contact with the tube. Such sleeve is connected by a frangible connector to the nut, and this connector breaks only after the sleeve effectively contacts the tube.

The "HI-DUTY" coupling commercially supplied by the assignee identified herein includes a continuous interior shearing groove and a continuous exterior shearing groove axially spaced from the interior groove. The interior groove opens radially inwardly, while the exterior groove opens radially outwardly. A radial wall portion or web or break point separates the grooves, and this web is sheared as a result of normal fitting makeup forces.

It is required that the radial wall or connecting portion be axially thin to facilitate shearing during normal makeup of the fitting. Such shearing is reported by a "give" during normal makeup, and one or two additional turns completes the tightening of the fitting, including sealing engagement of the sleeve with the wall of the tube. Sufficient thinness of the connecting radial wall at the break point is required so that shearing results with normal makeup of the fitting. If such radial wall portion is too thick, then the sleeve will not shear at the desirable makeup forces.

Failure of the sleeve to shear in making up the fitting leads to certain recognized problems. One such problem is the rotation of the sleeve with the nut, thus failing to make the desired seal with the tube because of irregu' 'ies between the sidewall of the tube and the continuous biting edges of the sleeve. Another serious problem is the scarring or damage to the wall of the tube when disassembling the fitting and removing the nut with the still attached sleeve. The continuous edge of the sleeve will scar or scrub the wall of the tube in its linear travel.

It is therefore a continuing problem of manufacturing control to provide the connecting wall portion sufficiently thin to attain such desired shearing. Difficulties have been encountered in controlling tolerances so that the interior shear groove is desirably spaced axially relative to the exterior shearing groove.

OBJECTS AND ADVANTAGES OF THE INVENTION

One object of the invention is to provide a one-piece nut and sleeve coupling element for use in a tube fitting in which an improved frangible connecting portion provides a sufficiently thin break point web between continuous exterior and interior shear grooves. A consequent advantage of meeting this object is the assurance that a sufficiently thin radial wall portion or web is provided as the break point to obtain desired shearing in normal makeup of the fitting. A further advantage arises from the manufacturing of the one-piece nut and sleeve coupling in that variations in placement of the continuous interior shear groove may be tolerated where such variations would not be acceptable in prior constructions.

SUMMARY OF THE INVENTION

The invention provides for a one-piece nut and sleeve male coupling element in which the frangible connecting portion has a continuous interior shear groove and continuous exterior shear grooves flanking said interior groove. In the machining operation, a recessed form cutting tool may be used in the bore of the one-piece nut and sleeve to form the continuous interior shear groove, and the exterior grooves may be formed with similar cutting tools or with other machining operations. The interior shear groove is positioned by preselected placement between the exterior shear grooves, thus defining a pair of break point webs. It will be appreciated that the interior shear groove may be axially displaced from desired placement, but a sufficiently thin break point web will still be provided so long as the interior shear groove is placed between the exterior shear grooves. If the interior shear groove is axially displaced from preselected placement, one web will be correspondingly thinner as the other web is widened. Consequently, a greater variation may be tolerated than that in prior art form where positioning of one interior and one exterior shear groove is substantially more critical. If the interior shear groove is displaced inordinately, relative to the exterior grooves, such unacceptable variation will be confirmed by the sleeve member breaking off during the machining operation. An intact sleeve indicates that one of the break point webs is sufficiently thin to provide the desired shearing when making up the fitting.

In preferred practice, the interior and exterior grooves are formed as angular cuts formed with one side straight and the other side tapered, or both sides tapered. It will be understood that such angular cuts may be modified as by forming the apex of the interior shear groove on a slight radius, and joining proximate arms of the exterior angular cuts along a slight radius also. In the preferred practice, the arms or sides of the interior shear groove are formed substantially parallel to the arms or sides of the exterior shear grooves so that the annular wall portions therebetween define break point webs which have a substantially uniform width. It is further provided that some sides of the exterior shear grooves are formed in curvilinear planes which define the continuous exterior sidewall of a cylindrical nut and sleeve assembly. The inner exterior shear groove is oriented relative to the interior shear groove so that the apex of the inner exterior shear groove is below the apex of the interior shear groove. Upon shearing, a side of the inner exterior shear groove is then positioned for camming relationship with a side of the interior shear groove. In this preferred embodiment, the outer end of the sheared sleeve is then deflected downwardly into the wall of the tube when the fitting is tightened.

In all of such embodiments, axial variations in the preselected placement of the interior shear groove will widen the widths of one of the break point webs while correspondingly reducing the substantially uniform width of the other break point web.

BRIEF DESCRIPTION OF THE DRAWINGS

Objects and advantages are realized by the invention, including those specifically recited as well as still others which will occur to practitioners upon considering the following disclosure of the invention, including drawings wherein.

DESCRIPTION OF PREFERRED EMBODIMENTS

Figure 4:
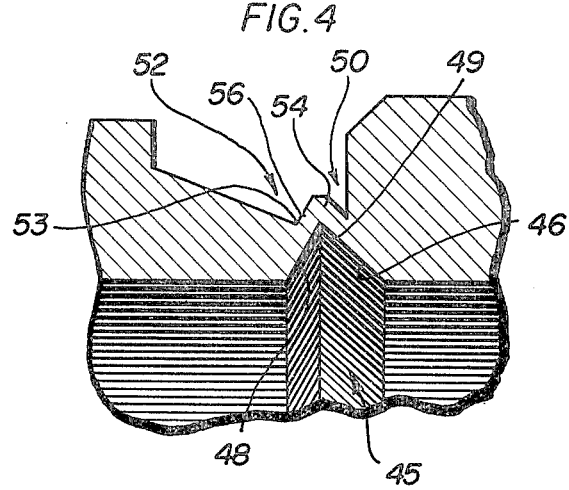
FIG. 4 is a fragmentary sectional view similar to that of FIG. 3 but showing an alternative embodiment.

The preferred embodiments to be described should be viewed as illustrative embodiments, and not as exclusive ones.

Referring to the drawings, a tube T extends from an assembled fitting. Such fitting comprises a female coupling element, shown generally as 5, and includes a body member with a nut 6 at one end, an externally threaded body portion 7 at the opposite end, and an intermediate spacing body 8. An axial bore or passageway 9 extends through the female coupling element, and within such passageway is located a continuous camming surface 10 and a continuous shoulder 11. The tube T is shown bottomed against the continuous shoulder 11, but it may be positioned short of the shoulder. The female coupling element 5 also has an internally threaded portion 12.

The female coupling element is shown coupled to a one-piece nut and sleeve assembly shown generally as 14. An axial bore or passageway 15 extends through the one-piece nut and sleeve assembly, and such passageway is coaxial with the passageway 9 in the female coupling element. A threaded outer portion 16 engages internally threaded portion 12 of the female coupling element. An outer nut portion 18 is spaced slightly from the threaded portion 16.

An inner sleeve portion 20 is located in the passageway space between the female coupling element 5 and the inserted tube T. The sleeve has a beveled nose 21 which is deflected by the continuous camming surface 10 within the passageway of the female coupling element 5. The male coupling element is tightened until this sleeve is sheared, whereupon continued tightening seals the sleeve to the wall of the Tube T.

Figure 3:
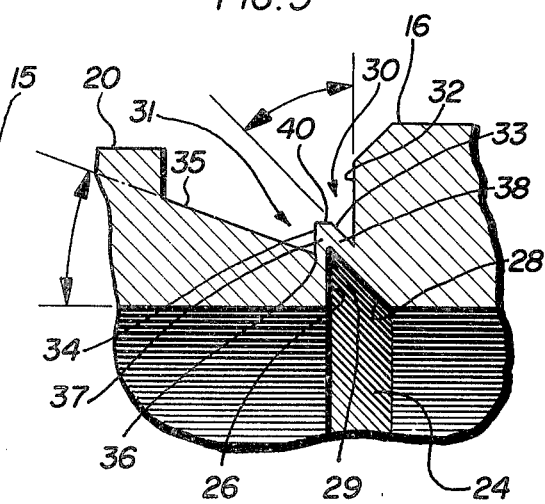
FIG. 3 is a fragmentary sectional view, on an enlarged scale, of the improved frangible connecting portion shown in FIG. 2.

The sleeve 20 is joined to the threaded portion 16 of the male coupling element by a frangible connecting portion shown generally as 22. Such frangible connecting portion includes a continuous interior shear groove 24 which is formed as a radially inwardly angular cut having a straight side 26 and a tapered side 28, see FIG. 3. The straight side 26 is coincidental with a radius of the tubular one-piece nut and sleeve assembly. Considered in another way, an extension of the plane of such straight side is perpendicular to the longitudinal axis of the one-piece nut and sleeve assembly, while the extension of the plane of the tapered side 28 forms an angle with said longitudinal axis. The sides 26, 28 form an apex 29 of the angular cut.

The frangible connecting portion also includes a pair of continuous exterior shear grooves, and outer exterior shear groove 30 spaced from an inner exterior shear groove 31. The continuous exterior shear grooves are shown in the preferred form of radially outwardly angular cuts. Thus, an outer exterior shear groove is formed by a straight side 32 and a shorter tapered side 33. Further, inner exterior shear groove 31 is formed by a short straight side 34 and a longer tapered side 35. Apices are formed in the angular cuts such as apex 36 between sides 34, 35. It will be appreciated that sides 33 and 35 of the angular cuts, which form the exterior shear grooves, lie in curvilinear planes since the nut and sleeve assembly has a cylindrical configuration.

An inner break point web 37 is shown as a radial wall portion having a substantially uniform width defined by straight side 26 of the interior shear groove spaced in parallel relationship to straight side 34 of inner exterior shear groove 31. An outer break point web 38 is also shown as a radial wall portion having a substantially uniform width formed by tapered side 28 of the interior shear groove spaced in parallel relationship to tapered side 33 of outer exterior shear groove 30. A terminating flat portion 40 joins break point webs 37 and 38. It is seen that the break point webs form an angle, and that inner break point web 37 is a side of the angle which extension is normal to the longitudinal axis of the axial passageway 15, while outer break point web 38 is a side of the angle which extension forms an angle with the longitudinal axis of said axial passageway 15.

The illustrated form represents an angle of 45° formed by the straight and tapered sides of the interior shear grooves and outer exterior shear grooves. An angle of 70° is represented between the tapered and straight sides of the inner exterior shear groove. Other angular cuts may be used, as well as other shear groove configurations. Generally, however, the break point webs should be of substantially uniform width.

Figure 1:
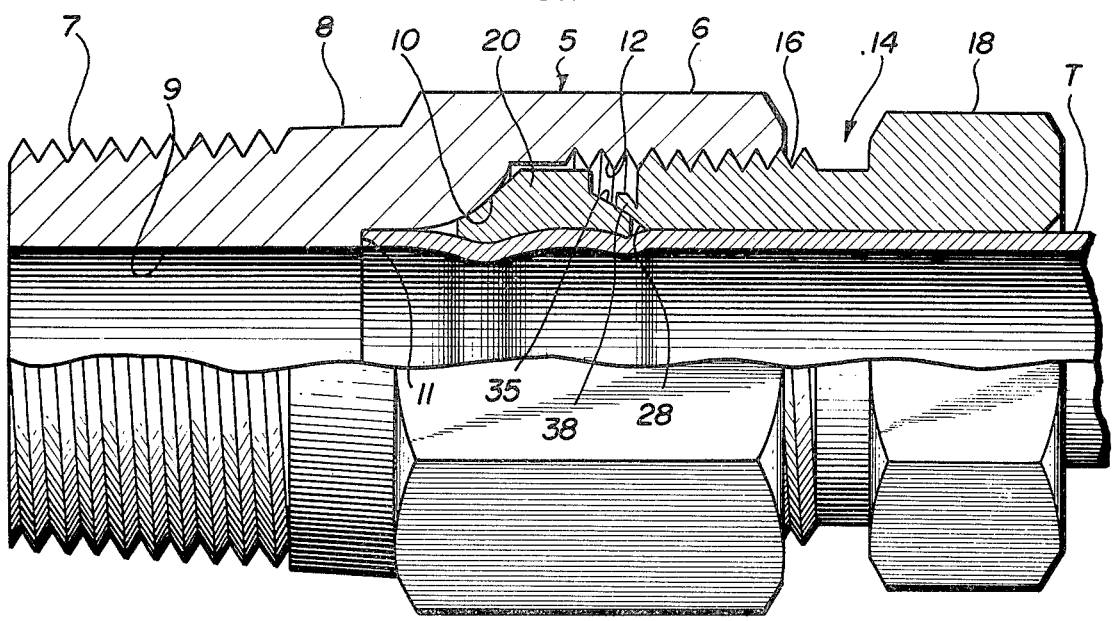
FIG. 1 is a side elevational view, partly in section, of the fitting showing the assembled coupling element with a connected tube.
Figure 2:
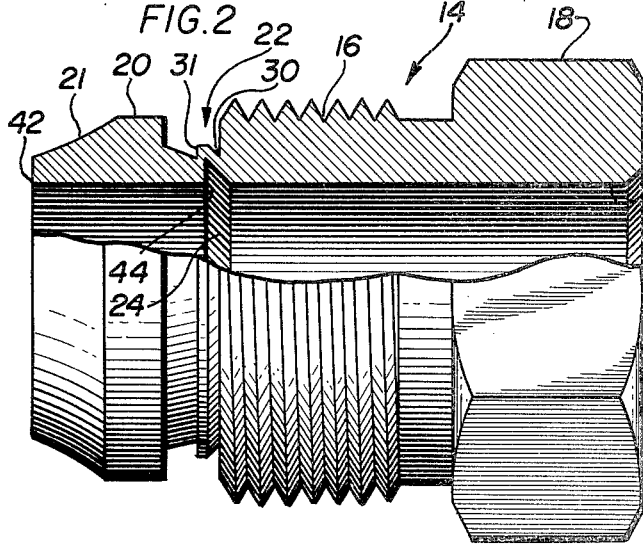
FIG. 2 is a side elevational view, partly in section, of the one-piece nut and sleeve coupling element showing the improved frangible connecting portion.

The apex 36 of the inner exterior shear groove is below apex 29 of the interior shear groove, and this allows side 35 of the inner exterior shear groove to be intercepted by side 28 of the interior shear groove after shearing. Side 28 becomes the camming surface of the nut member which deflects the outer nose of the sleeve into sealing engagement against the wall of the tube T. The continuous inner biting edge 42 and the outer continuous biting edge 44 of the sleeve deflectively seal the continuous wall of the tube, see FIG. 1. It is seen that the frangible connecting portion, defined by the shearing grooves and break point webs, is in the passageway space between the female coupling element 5 and the inserted tube T. Such frangible portion is seen to be substantially lowered relative to the greatest radial dimensions of the sleeve 20 and the female coupling element 5. It is also seen that the sleeve 5 fills substantially all of said space.

The interior shear groove is placed between the exterior shear grooves, and the configuration of the angular cut may take the alternative embodiment illustrated in the view of FIG. 4. The interior shear groove 45 is shown with tapered sides 46 and 48, and the extensions of these sides intercept the longitudinal axis of the fitting at an angle. The apex 49 of the angular cut which forms the interior shear groove forms an angle greater than 45°. An outer exterior shear groove 50 is spaced axially from an inner exterior shear groove 52, and the apex 53 of the inner exterior shear groove is below apex 49 of the interior shear groove. This will lead to the desired camming action after shearing. In this embodiment, the outer break point web 54 and the inner break point web 56 are also shown as having a substantially uniform width as defined by the sides of the interior and exterior shear grooves. It will be appreciated that the apex of the interior shear groove can be formed on a slight radius, and that the size of the exterior shear grooves which define the break point webs may also be connected along a slight radius. Operable break point webs will still be provided wherein one break point web assumes the desired thinner dimension where the other break point web assumes a thicker dimension, based on the placement of the interior shear groove between the exterior shear groove.

In use, the preselected placement of the interior shear groove will provide the break point webs at about equal thickness when there is no substantial variation from desired placement. If there is an axial displacement of the interior shear groove, then the uniform width of one of the break point webs will be widened while the other break point web is correspondingly decreased. This will provide one break point web of sufficient desired thinness so as to attain desired shearing of the sleeve upon normal makeup of the fitting.

The claims of the invention are now presented and the terms of such claims may be further understood by reference to the language of the preceding description and the views of the drawings.

What is claimed is:

1. In a tube fitting having a female coupling element with an internally threaded passageway and a one-piece male coupling element, said male coupling element having a body member, a passageway through such body member, an exterior threaded portion at one end, a shearable sleeve at the opposite end, and an intermediate frangible connecting portion in the passageway space between the female coupling element and an inserted tube, said frangible connecting portion being substantially lowered relative to said shearable sleeve and said female coupling element, the improvement to said frangible connecting portion, comprising
    a continuous outer exterior shear groove,
    a continuous inner exterior shear groove spaced axially relative to said outer exterior shear groove,
    a continuous interior shear groove placed between said exterior shear grooves,
    a inner break point web between the continuous inner exterior and continuous interior shear grooves, and
    an outer break point web between the continuous outer exterior and continuous interior shear grooves, at least one of said break points being sufficiently thin to obtain shearing of the sleeve upon making up the fitting by connecting the male and female coupling element.

2. The improvement to the one-piece coupling male element of the tube fitting as in claim 1 wherein said continuous interior shear groove and the exterior shear grooves are formed as angular cuts having sides and an apex between adjoining sides.

3. The improvement to the one-piece male coupling element of the tube fitting which includes the features of claim 2 wherein the apex of the inner-outer exterior shear groove is below the apex of the inerior shear groove so that a side of the inner exterior shear groove is intercepted by a side of the interior shear groove following shearing of the sleeve, thereby camming the outer end of the sleeve against an inserted tube.

4. The improvement to the one-piece male coupling element of the tube fitting which includes the features of claim 2 wherein each of the continuous exterior shear grooves has a straight side which extension is perpendicular to the longitudinal axis of the male coupling element and a tapered side which extension forms an angle with said longitudinal axis.

5. The improvement to the one-piece male coupling element of the tube fitting which includes the features of claim 4 wherein a substantial portion of each of the break point webs comprises a body portion of substantially uniform width.

6. The improvement to the one-piece male coupling element of the tube fitting which includes the features of claim 5 wherein said interior shear groove has a straight side which extension is perpendicular to the longitudinal axis of the male coupling element, and which further has a tapered side which extension forms an angle with said longitudinal axis.

7. The improvement to the one-piece male coupling element of the tube fitting which includes the features of claim 6 wherein said inner break point web is defined substantially by the straight sides of the continuous interior shear groove and the continuous inner exterior shear groove, a extension of said straight side of the continuous interior shear groove and the straight side of said inner exterior continuous shear groove defining a substantially uniform width for said inner break point web, and wherein said outer break point web is defined substantially by the tapered sides of the interior and the outer exterior shear grooves.

8. The improvement to the one-piece male coupling element in the tube fitting which includes the features of claim 2 wherein said inner and outer break point webs have spaced parallel sides defining body portions, each body portion having a substantially uniform width, the spaced parallel sides of the body portion of the inner break point web formed by a straight side of the inner exterior shear groove and a straight side of the interior shear groove, and the spaced parallel sides of the body portion of the outer break point web formed by a tapered side of the outer exterior shear groove and a tapered side of the interior shear groove.

9. The improvement to the one-piece male coupling element of the tube fitting which includes the features of claim 7 wherein the tapered and straight sides of the continuous outer exterior shear groove form a angle of about 45°, the tapered and straight sides of the continuous interior shear groove form an angle of about 45°, and the tapered and straight sides of the inner continuous exterior shear groove form an angle of about 70°.

10. The improvement to the one-piece male coupling element of the tube fitting which includes the features of claim 4 wherein one side of said interior shear groove is tapered and the other side is straight to form an angle greater than 45°.

* * * * *